United States Patent
Sato et al.

(10) Patent No.: US 10,327,580 B2
(45) Date of Patent: Jun. 25, 2019

(54) COFFEE MAKER

(71) Applicant: Zojirushi Corporation, Osaka-shi (JP)

(72) Inventors: Yoshiharu Sato, Osaka (JP); Masatoshi Maekawa, Osaka (JP); Shinpei Morita, Osaka (JP)

(73) Assignee: Zojirushi Corporation, Osaka (JP)

( * ) Notice: Subject to any disclaimer, the term of this patent is extended or adjusted under 35 U.S.C. 154(b) by 324 days.

(21) Appl. No.: 15/213,573

(22) Filed: Jul. 19, 2016

(65) Prior Publication Data

US 2017/0135520 A1     May 18, 2017

(30) Foreign Application Priority Data

Nov. 16, 2015   (JP) .................................. 2015-223851

(51) Int. Cl.
  *A47J 31/46*   (2006.01)
  *A23F 5/26*   (2006.01)
(52) U.S. Cl.
  CPC ............... *A47J 31/465* (2013.01); *A23F 5/26* (2013.01)
(58) Field of Classification Search
  CPC ................................. A23F 5/26; A47J 31/465
  USPC ......................................................... 99/285
  See application file for complete search history.

(56) References Cited

U.S. PATENT DOCUMENTS 3,451,330 A * 6/1969 Bender ............... A47J 31/0621
                                                        99/299

FOREIGN PATENT DOCUMENTS

| JP | 58106038 U | * | 7/1983 |
| JP | 597732 U   |   | 1/1984 |
| JP | 59133125 U | * | 9/1984 |
| JP | 59174118 A |   | 10/1984 |
| JP | 60116937 U | * | 8/1985 |
| JP | 61179115 A |   | 8/1986 |

* cited by examiner

*Primary Examiner* — Dana Ross
*Assistant Examiner* — Kuangyue Chen
(74) *Attorney, Agent, or Firm* — The Webb Law Firm

(57) ABSTRACT

Provided is a coffee maker where a heated state coffee liquid can be obtained by performing an extraction operation in an extraction unit, and can be sufficiently cooled down to a temperature, to provide tasty iced coffee, and in which a cooled state of the coffee liquid can be maintained. An ice basket is arranged inside a server, and is disposed to receive and disperse the coffee liquid that is dripping from an extraction unit. The ice basket is formed in a vertically elongated shape, and internally includes an ice storage. A liquid feeding hole, which feeds the coffee liquid inside the ice storage to the server, is formed in a peripheral edge portion of a bottom portion. The bottom portion is arranged at a position close to a bottom surface of the server while being separated from the bottom surface.

1 Claim, 7 Drawing Sheets

COFFEE MAKER

CROSS-REFERENCE TO RELATED APPLICATION

This application claims priority to Japanese Patent Application No. 2015-223851 filed Nov. 16, 2015, the disclosure of which is hereby incorporated in its entirety by reference.

BACKGROUND OF THE INVENTION

Field of the Invention

The present invention relates to a coffee maker including a water tank that stores water, a heating and hot water supply mechanism that heats the water supplied from the water tank so as to generate hot water, and that supplies the generated hot water via a guide passage, an extraction unit that extracts a coffee liquid by receiving the hot water supplied from the heating and hot water supply mechanism, in a state of containing coffee powder, and a server that stores the coffee liquid extracted in the extraction unit.

Description of Related Art

A coffee maker having this configuration can store a coffee liquid in a server in such a way that a user operates an extracting switch in a state where water is supplied to a water tank and coffee powder is contained in an extraction unit.

Here, the coffee liquid stored in the server is extracted in the extraction unit after hot water is supplied from a heating and hot water supply mechanism, thereby providing so-called hot coffee (coffee liquid in a heated state).

When in use, the user puts a predetermined amount of coffee powder into the extraction unit in accordance with the user's desired number of cups, and pours the water into the water tank to reach the amount corresponding to the same number of cups. In this manner, a predetermined amount of hot coffee liquid can be obtained. The concentration of the coffee liquid can be adjusted by adjusting the amount of water poured into the water tank (in a case where the water poured into the water tank is always used up), or by adjusting the amount of the water supplied from the water tank via the heating and hot water supply mechanism (in a case where a dispensing amount of the water inside the water tank is adjustable).

With regard to the coffee maker which can obtain this hot coffee, Patent Document 1 and Patent Document 2 disclose a coffee maker which can also obtain iced coffee.

A technology disclosed in Patent Document 1 relates to a "coffee machine", and the coffee machine includes an ice storage rack 12 (corresponding to an ice basket in the present Patent Application) inside a decanter 7 (corresponding to a server in the present Patent Application). The iced coffee can be obtained by delivering the coffee liquid dripping from a chamber 6 (corresponding to an extraction unit in the present Patent Application) containing the coffee powder to a surface of ice stored inside the ice storage rack 12.

A technology disclosed in Patent Document 2 relates to a "dripping coffee machine which also provides iced coffee", and the machine includes a basket 15 (corresponding to the ice basket in the present Patent Application) inside a coffee bottle 9 (corresponding to the server in the present Patent Application). The iced coffee can be obtained by delivering the coffee liquid dripping from a filter 10 (corresponding to the extraction unit in the present Patent Application) containing the coffee powder to a surface of ice stored inside the basket 15.

Both technologies can obtain iced coffee by causing the coffee liquid in a heated state to drip from the extraction unit including the ice basket. However, the ice basket has a shallow shape whose bottom portion is located in a central portion of the server from a bottom surface of the server. It is understood that the ice inside the basket is not immersed in the obtained coffee liquid.

Furthermore, the coffee liquid is not supposed to be taken out from the ice basket itself.

RELATED ART DOCUMENT

Patent Documents

[Patent Document 1] JP-A-61-179115
[Patent Document 2] JP-Utility-Model-Application-Publication-59-7732

SUMMARY OF THE INVENTION

The present inventors have intensively studied the coffee maker adopting the above-described configuration. According to the previously described coffee maker, it was found that a cooled degree of the coffee liquid depends on a time that gravity causes the ice to flow down, and that in some cases, the coffee liquid cannot be sufficiently cooled down to a temperature allowing tasty iced coffee.

Furthermore, with regard to the obtained iced coffee, there is a limitation when the coffee liquid maintains a tasty and cooled state for drinking.

An object of the present invention is to obtain a coffee maker in which a heated state coffee liquid obtained from an extraction unit can be sufficiently cooled down to a temperature allowing tasty iced coffee, and in which a cooled state thereof can be maintained, and furthermore, in which the iced coffee in the cooled state can be easily taken out therefrom.

In order to achieve the above-described object, according to a characteristic configuration of the present invention, there is provided a coffee maker including:

a water tank that stores water, a heating and hot water supply mechanism that heats the water supplied from the water tank so as to generate hot water, and that supplies the generated hot water via a guide passage, an extraction unit that extract a coffee liquid by receiving the hot water supplied from the heating and hot water supply mechanism, in a state of containing coffee powder, a server that stores the coffee liquid extracted in the extraction unit, and a bottomed cylindrical ice basket that is arranged inside the server, and that receives and disperses the extracted coffee liquid from the extraction unit.

The ice basket internally includes an ice storage which is formed in a vertically elongated shape, a liquid feeding hole which feeds the coffee liquid inside the ice storage to the server is formed in a peripheral edge portion of a bottom portion of the ice basket, and the bottom portion is arranged at a position close to a bottom surface of the server while being separated from the bottom surface.

When iced coffee is prepared, ice contained inside the ice basket is used. However, according to the present characteristic configuration, the coffee liquid extracted from the extraction unit is accepted on the ice in a state where the coffee liquid is dispersed into the ice basket. The coffee liquid is caused to drip onto the ice contained inside the ice storage formed in the vertically elongated shape over as long a period of time as possible so as to reach the liquid feeding hole disposed in the peripheral edge portion on the bottom portion of the ice basket. In this manner, the coffee liquid is fed into and stored in the server.

Therefore, first of all, a contact time between the coffee liquid and the ice is lengthened. Accordingly, the coffee liquid can be sufficiently cooled.

Furthermore, the bottom portion of the ice basket is located close to the bottom surface of the server, and the ice basket is located inside the server. Accordingly, the ice inside the ice storage is brought into an immersed state in the low temperature state coffee liquid (iced coffee) stored inside the server. Therefore, the low temperature of the coffee liquid can be maintained.

On the other hand, the bottom portion of the ice basket is located close to the bottom surface of the server, but is arranged while being separated therefrom (for example, not in contact with the bottom surface while being arranged separately as far as approximately several mm to 1 cm). Accordingly, it is possible to avoid the server from receiving a mechanical or thermal impact from the ice basket side. For example, it is possible to avoid an impact from being applied to the server when the cooled state ice basket containing the ice is mounted on the server.

According to another characteristic configuration of the present invention, the ice basket is located inside the server while being suspended from an upper site of the server.

According to the present characteristic configuration, when the ice basket and the server are attached to each other, a portion required for suspending may be disposed in only the upper site of the server. As a result, a space inside the server can be relatively freely used. In addition, a shape of the server can be freely selected, and it is also possible to use the server employed for storing hot coffee in the related art.

According to another characteristic configuration of the present invention, the ice basket is configured to have a peripheral wall portion erected from the bottom portion and a peripheral edge portion of the bottom portion in an axial direction, the ice basket is provided with a lid which is engageably connected in a state of covering an axially open end of the ice basket, and the ice basket is suspended from the upper site of the server via the lid.

According to the present characteristic configuration, in order to suspend the ice basket inside the server, the lid for covering the axially open end of the ice basket is used. In this way, the lid side is caused to adopt a configuration required for suspending the ice basket from the server. Accordingly, it is possible to provide a very reliable ice basket since the lid side takes charge of a portion connected to the server which is likely to be a relatively complicated structure. Furthermore, in a case where the server includes the lid, a simple configuration for suspending the ice basket in the lid may be adopted.

According to another characteristic configuration of the present invention, in a case where there are provided the ice basket and the lid, the coffee maker further includes a coffee liquid circulation passage that is disposed at a position between the ice basket and the lid, which corresponds to a coffee liquid spout of the server, that prevents ice from coming out from the inside of the ice storage, and that allows the coffee liquid to flow into or to flow out from the ice basket.

The coffee maker according to the present invention stores iced coffee (coffee liquid in a cooled state) not only outside the ice basket in the server, but also inside the ice storage in the ice basket.

Therefore, in a case where the iced coffee is taken out, the coffee liquid present outside the ice basket can be taken out from the coffee liquid spout disposed in the server. However, in order to take out the coffee liquid present inside the ice basket via the liquid feeding hole, it takes time undesirably since a circulation passage of the coffee liquid is lengthened.

On the other hand, there is a possibility that the ice may pop out if a user tries to take out the iced coffee through an opening located in an upper portion of the ice basket.

Therefore, since the present characteristic configuration previously described is adopted, the iced coffee can be directly taken out via the coffee liquid circulation passage formed between the ice basket and the lid, while the ice is prevented from coming out.

The iced coffee can be smoothly taken out, if this coffee liquid circulation passage is configured to be a passage formed in a site which is substantially the same as or close to the coffee liquid spout in circumferential phase in the circumferential direction of the ice basket which is a vertically elongated cylindrical member.

Here, the ice is supposed to be small since the iced coffee is completely prepared. However, it means the ice having a disadvantageous size, for example, if the ice falls down into a cup. For example, it means the ice whose diameter exceeds 1 cm.

According to another characteristic configuration of the present invention, the coffee maker further includes:

a checking window that is disposed in a peripheral wall portion of the ice basket, and through which ice inside the ice storage is visible.

The water tank has a water quantity indicating scale for ice which indicates a water quantity for obtaining iced coffee having a predetermined concentration, and the checking window is arranged at a position where a predetermined amount of ice is visible which is adapted to cool the coffee liquid obtainable by using the water quantity adjusted to the water quantity indicating scale for ice.

According to the present characteristic configuration, when the iced coffee is prepared, a fixed index to indicate the quantity of ice can be shown to a user, based on the water quantity inside the water tank or the position of the checking window disposed in the ice basket. In a case where iced coffee is repeatedly prepared, the user can obtain iced coffee of which a concentration varies less.

In this regard, for example, if the ice basket is produced using a transparent member, coffee grounds adhere thereto, and dirty spots readily become conspicuous. However, in a case where the containing quantity of the ice cannot be visually checked from the outside by forming the ice basket using a member whose inside is invisible, if the window is provided, the ice quantity can be easily checked. Furthermore, it becomes easy to control the concentration of the iced coffee, thereby improving usability.

As described above, it is possible to obtain a coffee maker in which the obtained coffee liquid in a heated state can be sufficiently cooled down to a temperature allowing tasty iced coffee, and in which a cooled state thereof can be maintained, and furthermore, in which the iced coffee in the cooled state can be easily taken out therefrom.

DESCRIPTION OF THE INVENTION

Hereinafter, a coffee maker 100 according to the present invention will be described with reference to the drawings.

The coffee maker 100 not only can extract hot coffee, but also can prepare iced coffee.

In a case where the iced coffee is prepared, an ice basket 10a which is uniquely provided in the present application is used by being mounted on a server 5. Since the ice basket 10a is used, the iced coffee can be sufficiently cooled down to a low temperature. Furthermore, a coffee liquid c can be maintained in the low temperature, and a user can enjoy tasty iced coffee.

Figure 1:
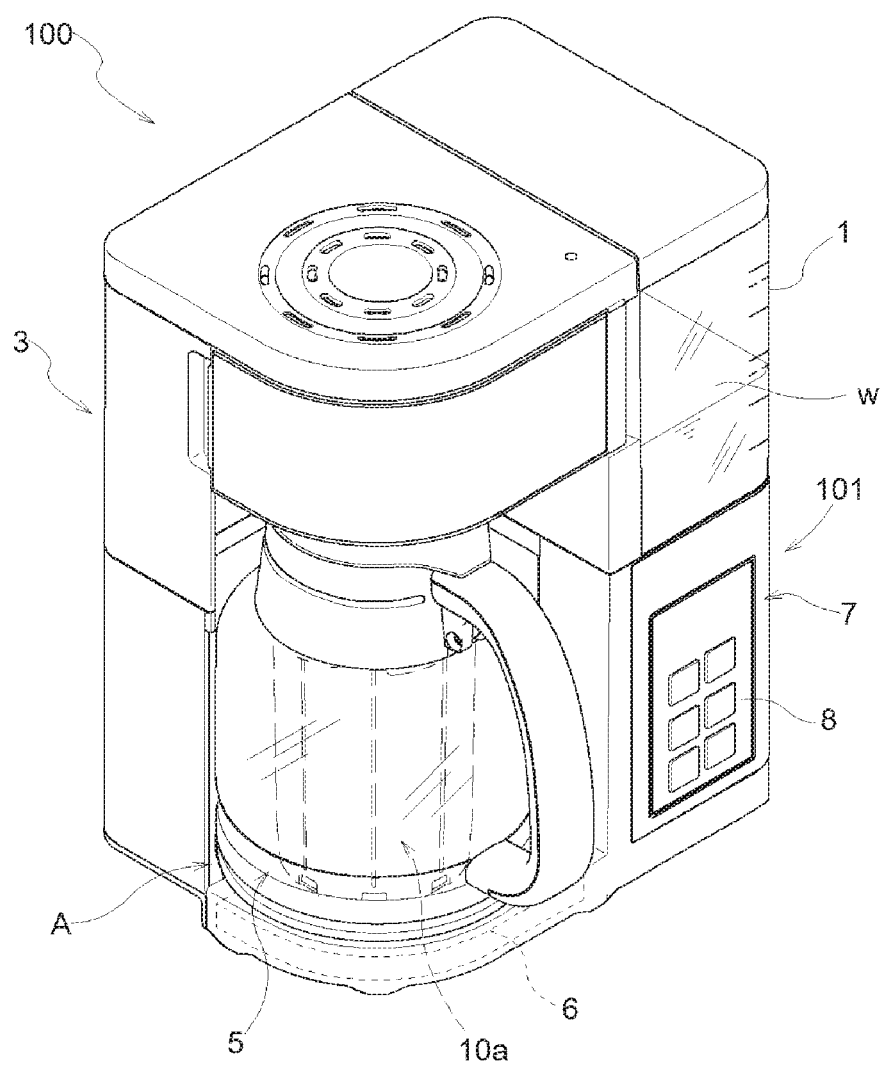
FIG. 1 is a view illustrating an overall configuration of a coffee maker.
Figure 2:
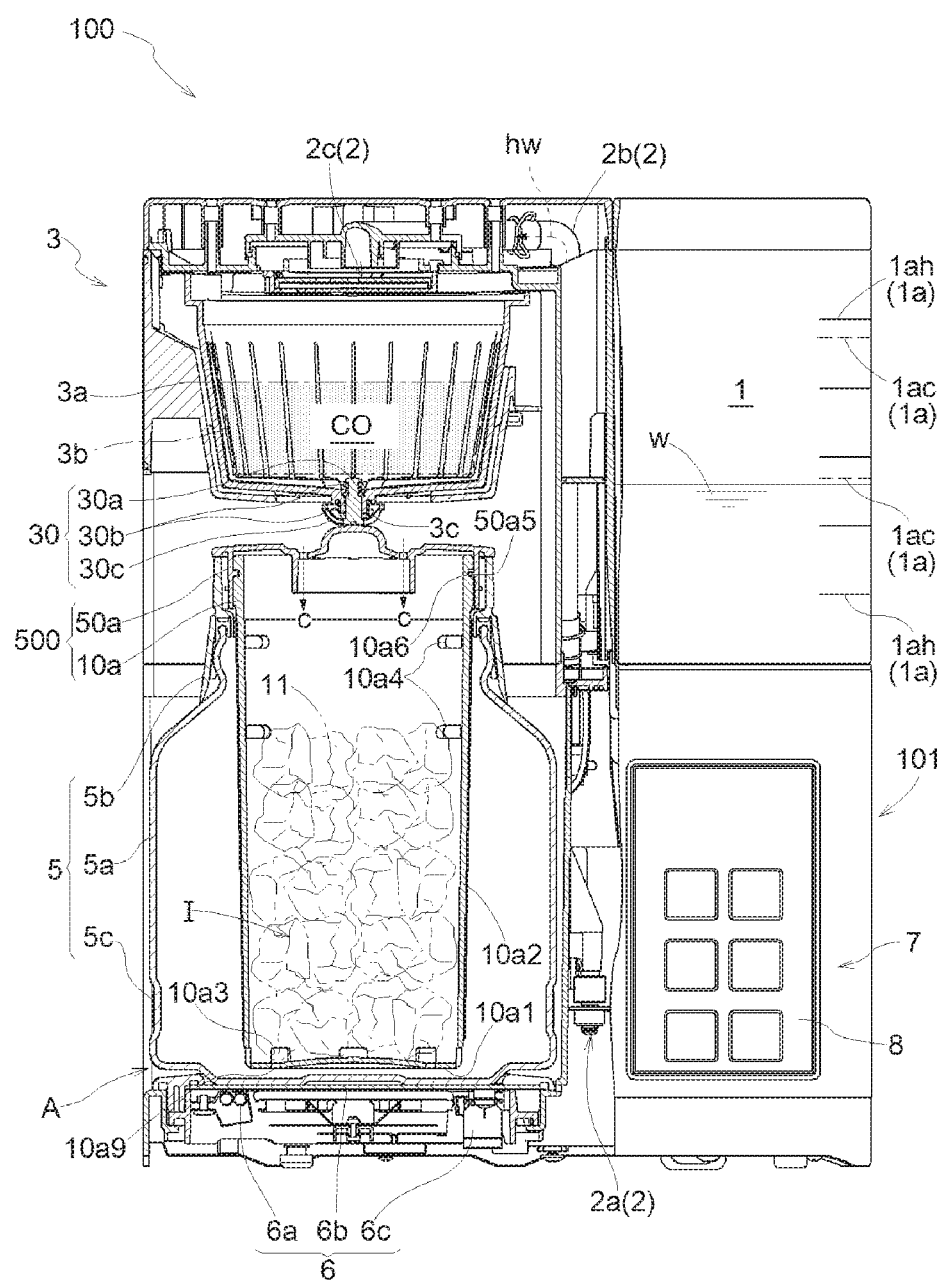
FIG. 2 is a sectional view of the coffee maker illustrating a state where a server containing an ice basket is placed on a warmth keeping and heating mechanism.

FIG. 1 illustrates an external view of the overall coffee maker 100, and FIG. 2 illustrates a sectional view of the coffee maker 100 in a state where the server 5 containing the mounted ice basket 10a is placed on a warmth keeping and heating mechanism 6. According to the present embodiment, in order for the server 5 to contain the mounted ice basket 10a, the ice basket 10a is connected so as to engage with a lid 50a of the server 5, and is suspended inside the server 5. Accordingly, in order to facilitate description thereof, an integrated connection structure between the lid 50a and the ice basket 10a is referred to as a lid-ice basket connection body 500, in some cases.

As is understood from FIG. 2, the coffee maker 100 according to the present invention includes a water tank 1 that stores water w, a heating and hot water supply mechanism 2 that heats the water w supplied from the water tank 1 so as to generate hot water hw, and that supplies the generated hot water hw to an extraction unit 3 via a guide passage 2b, the extraction unit 3 that extracts a coffee liquid c by causing the hot water hw supplied from the heating and hot water supply mechanism 2 to disperse and drip, in a state where coffee powder CO is contained, and the server 5 that stores the coffee liquid c extracted in the extraction unit 3.

Furthermore, the warmth keeping and heating mechanism 6 for keeping the warmth of the coffee liquid c at a predetermined temperature in a case where the server 5 stores hot coffee is provided in a lower portion of a server placement space A.

In addition, there is provided a control unit 7 that controls an operation of the overall coffee maker 100, and an operation unit 8 for inputting predetermined information required for the operation is disposed in the control unit 7.

The control unit 7 is configured to operate the coffee maker 100 in accordance with input information input from the operation unit 8 (for example, the number of cups of the coffee liquid c to be prepared, a warmth keeping temperature of hot coffee, or time information required for keeping the warmth of the hot coffee).

In a state where the coffee maker 100 receives an extraction start operation serving as a coffee extraction command, the coffee maker 100 causes the heating and hot water supply mechanism 2 to heat the water w inside the water tank 1 so as to generate the hot water hw, feeds the hot water hw to the extraction unit 3 via the guide passage 2b, and causes the extraction unit 3 to extract a predetermined quantity of the coffee liquid c in a heated state.

In a case where a user wants to obtain hot coffee, the coffee liquid c in a heated state is caused to drip to the server 5 without any change. In a case where the user wants to obtain iced coffee, the coffee liquid c is caused to disperse and drip on ice 11 contained inside the ice basket 10a.

When this extraction operation is performed, the water quantity required for extraction can be set to the whole quantity contained inside the water tank 1, or can be adjusted depending on the input number of cups.

In any case, according to the coffee maker 100, the quantity of the coffee liquid c stored in the server 5 is controlled in accordance with the water quantity inside the water tank 1 or the information input from the operation unit 8. In this manner, the user can obtain hot coffee or iced coffee as much as the user needs.

The water tank 1 can be detached from the coffee maker main body 101. The user properly supplies the water w to the water tank 1, thereby adopting a configuration in which the hot water hw to be fed to the extraction unit 3 can be generated. A check valve structure is employed in the vicinity of an outlet of the water tank 1, thereby preventing a backflow of the hot water hw. Furthermore, index lines 1a (quantity indicating scale) which are substantially horizontal in a state where the water tank 1 is mounted on the coffee maker main body 101 are marked in the water tank 1, thereby enabling the user to check the quantity of the water w inside the water tank 1.

The water tank 1 according to the present invention is provided with index lines for hot coffee 1ah and index lines for iced coffee 1ac, as the index lines 1a.

Solid lines extending in the horizontal direction in FIG. 2 represent the index lines for hot coffee 1ah marked for each number of cups, and broken lines represent the index lines (water quantity indicating scale for ice) 1ac marked for three cups or five cups of iced coffee. The index lines for iced coffee 1ac configured in this way correspond to a height position of checking windows 10a4 (to be described later) provided in a peripheral wall portion 10a2 of the ice basket 10a. That is, the water w having the water quantity in accordance with the index lines for iced coffee 1ac which are marked in the water tank 1 is poured into the water tank 1, and a predetermined quantity of coffee powder CO in accordance with the number of cups is put into the extraction unit 3. Furthermore, the extraction is started after ice 11 is put into the ice basket 10a so as to reach the height of the position where the ice 11 is visible through the checking windows 10a4 disposed in the ice basket 10a. In this manner, a configuration is adopted in which a user can obtain iced coffee having preferred concentration as much as the user desires to drink.

According to the coffee maker 100 of the present invention, in order to prepare the iced coffee, standardization is performed on the water quantity, the coffee powder quantity, and the quantity of the ice 11 contained in the ice basket 10a (furthermore, a containing height, corresponding to a dripping distance in which the coffee liquid c in a heated state drips on the ice surface). In this manner, variations in the concentration of the iced coffee are minimized. Furthermore, for example, the user performs an equal operation for increasing or decreasing the water quantity. Accordingly, regardless of the number of uses, the user can obtain the iced coffee having the user's favorite concentration.

The heating and hot water supply mechanism 2 is disposed on a lower side of the water tank 1, which heats the water w properly dispensed from the water tank 1 and feeds the hot water hw to the guide passage 2b. For this purpose, the heating and hot water supply mechanism 2 is provided with a heater for drip 2a and a supply mechanism (not illustrated). The hot water hw generated in the heater for drip 2a (substantially boiled water) can be fed to the extraction unit 3 via the guide passage 2b as much as a predetermined quantity at a time.

As is understood from FIG. 2, a dispersing drip unit 2c which disperses the hot water hw supplied via the guide passage 2b and causes the hot water hw to drip to the extraction unit 3 is disposed in an outlet site of the guide passage 2b in the heating and hot water supply mechanism 2, that is, in an upper portion of the extraction unit 3.

With regard to the configuration of the extraction unit 3, the present embodiment adopts a configuration in which a filter cup 3a is contained at a predetermined position (upper portion of the server 5 placed on the warmth keeping and heating mechanism 6 which is a lower portion of the dispersing drip unit 2c). A filter 3b internally containing the coffee powder CO is contained in the filter cup 3a, and the hot water hw drips thereto, thereby extracting the coffee liquid c. The coffee liquid c drips to the server 5 from a dripping hole 3c formed in the bottom of the filter cup 3a.

The dripping hole 3c is provided with a dripping adjustment valve mechanism 30 which causes the coffee liquid c to drip from the filter cup 3a. As illustrated in FIG. 2, the lid 50a connected to the ice basket 10a is mounted on an upper portion support ring 5b of the server 5 (in a state where the iced coffee is prepared). The extracted coffee liquid c in a heated state flows into the ice basket 10a. According to the coffee maker 100, the lid 50a is used by being mounted on the server 5 even in a case where hot coffee is extracted.

As illustrated, the dripping adjustment valve mechanism 30 is configured to include a slider 30a which moves in a vertical direction along a central axis of the filter cup 3a, a pair of upper and lower biasing springs 30b which bias the slider 30a to the upper side and the lower side, and a dispersing cap 30c which extends upward from a lower end of the slider 30a in an arc shape in a cross section. Multiple holes are disposed in a site around the axis of the dispersing cap 30c. As a result, a dripping state of the extracted coffee liquid c is determined and adjusted in accordance with the position in the vertical direction of the slider 30a.

In a state where the hot coffee is extracted, the server 5 receives the coffee liquid c from above.

A detailed structure of the server 5 including the ice basket 10a which is one characteristic of the present application will be described later.

The warmth keeping and heating mechanism 6 is configured to include a warmth keeping heater 6a, a warmth keeping plate 6b included in an upper portion of the warmth keeping heater 6a, and a thermistor 6c disposed in an end portion of the warmth keeping plate 6b. The warmth keeping heater 6a is an electric heater which generates heat by receiving power supply. The warmth keeping plate 6b is formed using a metal plate having high thermal conductivity. On the other hand, the thermistor 6c is disposed in order to detect the temperature of the warmth keeping plate 6b.

In accordance with the detected temperature of the thermistor 6c, the warmth keeping heater 6a is controlled to be turned on and off so that the temperature reaches a predetermined target temperature. In a state where the hot coffee is stored inside the server, the warmth keeping heater 6a can keep the warmth of the coffee liquid c.

Hitherto, the overall coffee maker 100 has been described.

Hereinafter, the server 5 and the ice basket 10a will be sequentially described.

Figure 3B:
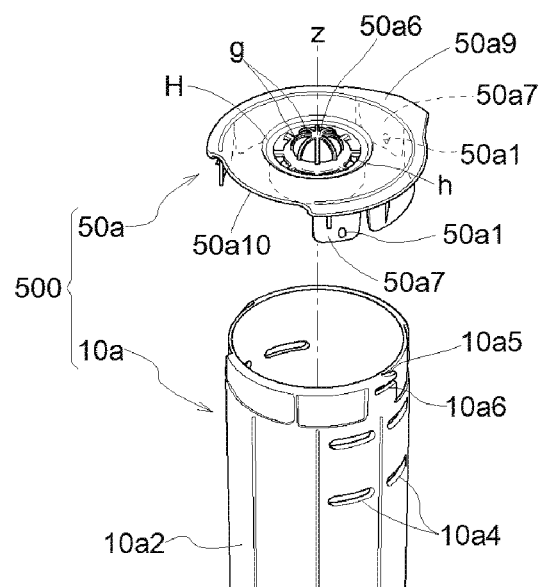
FIG. 3B is an exploded view illustrating a state where the ice basket is detached from the server.
Figure 3A:
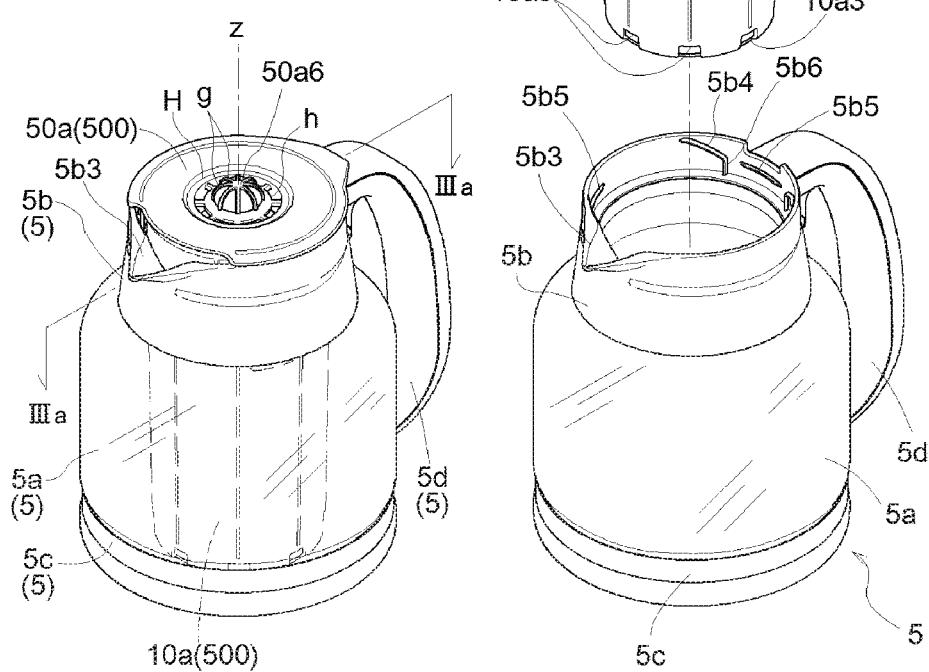
FIG. 3A is an external view of the server in a state of containing the ice basket.

FIG. 3A illustrates an external view of the server 5 in a state where the ice basket 10a is contained, and FIG. 3B illustrates a state where the ice basket 10a is detached from the server 5. The ice basket 10a according to the present invention is used while being engageably connected to the lid 50a. However, FIG. 3B illustrates the lid 50a detached from the ice basket 10a.

The lid 50a is provided for the server 5. According to the present invention, the lid 50a is also used for supporting while suspending the ice basket 10a from the server 5.

Figure 4:
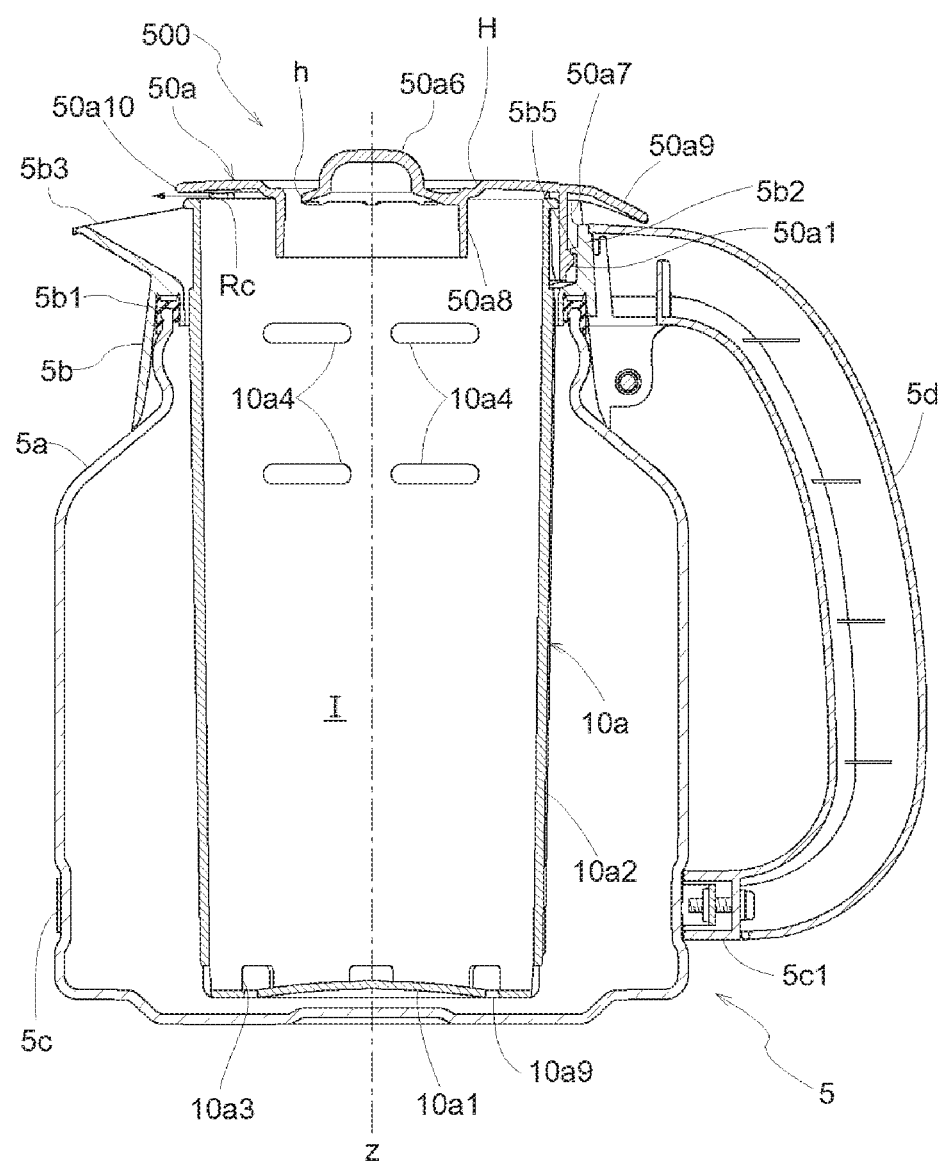
FIG. 4 is a sectional view of the server in a state of containing the ice basket.

In addition, FIG. 4 is a sectional view of the server 5 in a state of containing the ice basket 10a illustrated in FIG. 3A, and illustrates a cross section in which a handle 5d is cut at the center in a width direction thereof (cross section taken along line IIIa-IIIa in FIG. 3A).

The lid 50a can engage with the server 5 in such a way that the lid 50a is lowered and pushed into the upper portion support ring 5b of the server 5 from above. On the other hand, when both of these are separated from each other, both of these can be easily separated in the axial direction by using a space between an engaging projection 5b5 and a stopper projection 5b6 which are included in the upper portion support ring 5b of the server 5 illustrated in FIG. 3B.

On the other hand, the ice basket 10a and the lid 50a engage with each other by using a so-called bayonet structure, thereby adopting a configuration in which both of these can be separated from each other.

The bayonet structure means engageable connection as follows. In a rotational phase relationship around a predetermined central axis z, both of these to be engaged are relatively moved close to each other in the axial direction (specifically, for example, in a state where a position of an engaged side member located on the lower portion side is fixed, an engaging side member located on the upper portion side is relatively moved downward). A pair of engaging sites disposed in both of these are moved to an engageable position in the axial direction. Furthermore, both of these are relatively pivoted in the circumferential direction around the axial direction (specifically, both of these are pivoted to reach an engagement position from a disengagement position).

Therefore, when the iced coffee is prepared, in a state where the ice 11 is contained inside the ice basket 10a, the ice basket 10a is attached to the lid 50a. A lid-ice basket connection body 500 in which both of these are integrated is engageably connected to the upper portion support ring 5b of the server 5. In this manner, the ice basket 10a can be contained and arranged inside the server 5.

Hereinafter, associated members will be sequentially described.

Server

As described above, the server 5 is configured to include a server main body 5a serving as a transparent glass storage, the handle 5d for supporting the server main body 5a, and the upper portion support ring 5b and a lower portion support ring 5c which connect the handle 5d to the server main body 5a.

Upper Portion Support Ring

The upper portion support ring 5b is an annular member which is integrally mounted on an upper end site of the server main body 5a via an elastic sealing member 5b1. As illustrated in FIG. 4, a handle mounting portion 5b2 is disposed, and a coffee liquid spout 5b3 is disposed in an opposing site located on the opposite side in the radial direction. Here, the coffee liquid spout 5b3 has a tapered V-shape in a schematic sectional view.

Furthermore, as illustrated in FIGS. 3B and 4, an inner peripheral site of the upper portion support ring 5b includes an engaging guide projection 5b4, an engaging projection 5b5, and a pivoting stopper projection 5b6. A server engaging projection 50a1 disposed in the lid 50a is guided, engaged, and subjected to pivot regulation, thereby adopting a configuration in which the ice basket 10a can be engageably connected to the upper portion support ring 5b.

Lower Portion Support Ring

The lower portion support ring 5c is a belt-shaped member which is annularly and integrally mounted on a lower site of the server main body 5a. As illustrated in FIG. 4, a handle mounting portion 5c1 is disposed in the lower portion support ring 5c.

Handle

As is understood from FIG. 4, the handle 5d is mounted on the server main body 5a via the upper portion support ring 5b and the lower portion support ring 5c.

Therefore, a user uses the handle 5d, thereby enabling the user to take out the server 5 from the warmth keeping and heating mechanism 6 of the coffee maker 100 or to place the server 5 thereon.

Ice Basket

The ice basket 10a is used by being mounted on the lid 50a for covering an axially open end of the ice basket 10a.

As illustrated in FIGS. 3A-4, the ice basket 10a is configured to serve as a bottomed and vertically elongated cylindrical member including a bottom portion 10a1 and a peripheral wall portion 10a2 erected from the peripheral edge portion of the bottom portion 10a1 in the axial direction. The ice basket 10a internally includes an ice storage I, and is configured so that a liquid feeding hole 10a3 for feeding an internal liquid outward is provided at multiple locations in the peripheral edge portion of the bottom portion 10a1. The liquid feeding hole 10a3 is formed to have a relatively small width, and has a size which does not allow the ice 11 to come out therefrom. For example, the width is 5 mm or smaller. In this example, small holes 10a9 are equally disposed in the bottom portion 10a1 of the ice basket 10a in the circumferential direction (refer to FIG. 4).

The ice basket 10a is configured to include a resin member of a dark color (specifically, a black color) so that a dirty spot caused by coffee is less likely to be conspicuous.

Furthermore, the checking windows 10a4 (in the illustrated example, for three cups and for five cups) are disposed in order to visually check the ice 11 inside the ice storage I corresponding to the index lines for iced coffee 1ac disposed in the water tank 1 described above. As a matter of course, the checking windows 10a4 for three cups are located at a lower position than the checking windows 10a4 for five cups.

In addition, as illustrated in FIGS. 2 and 3B, a site in the vicinity of the upper end of the ice basket 10a is configured to include a bayonet guide recess 10a5 and an engaging recess 10a6 in order to realize a bayonet structure with the lid 50a. A circumferential end of the engaging recess 10a6 functions as a stopper. As a result, an ice basket engaging projection 50a5 (refer to FIG. 2) disposed in the inner peripheral portion of the lid 50a is guided, engaged, and subjected to pivot regulation, thereby adopting a configuration in which the lid 50a can be engageably connected to the ice basket 10a (engageable connection using a bayonet structure).

[Lid]

As is understood from FIGS. 3A-4, the lid 50a is formed in a substantially disc plate shape, and is configured to include an upward projection 50a6 protruding in a dome shape on the upper side in the central site, to include an engaging downward suspending portion 50a7 in a lower side outer peripheral specific phase site, and to include an annular downward suspending portion 50a8 at a position on the outer peripheral side from the upward projection 50a6.

Furthermore, the lid 50a is configured to include a handle cover portion 50a9 located in the upper portion of the handle 5d in an engaged state, and a cover retreat portion 50a10 disposed at a corresponding position on the coffee liquid spout 5b3 of the server 5.

As described above, the upward projection 50a6 has a shape protruding in a dome shape on the upper side in the central site of the lid 50a, and includes 8 guides g (refer to FIGS. 3A, 3B and 5) which are equally arranged on the upper surface in the circumferential direction. A protruding amount of the upward projection 50a6 is configured so that the above-described dripping adjustment valve mechanism 30 has a positional relationship to allow the coffee liquid c to drip by adopting a posture in which the server 5 is placed on the warmth keeping and heating mechanism 6.

A portion between the guides g is formed to be solid. The coffee liquid c dripping from above disperses and drips to dripping holes h disposed close to the outer periphery of the upward projection 50a6, and disperses and drips downward via the dripping holes h. As is understood from FIGS. 4 and 5, a radial location where the dripping holes h are disposed serves as a recess H having a predetermined radial width.

In a form of surrounding the outer diameter side of the respective dripping holes h, the above-described annular downward suspending portion 50a8 is disposed on a rear surface of the recess H.

The server engaging projection 50a1 engaging with the engaging projection 5b5 disposed in the upper portion support ring 5b is disposed on the outer peripheral side of the engaging downward suspending portion 50a7. The ice basket engaging projection 50a5 fitted into the engaging recess 10a6 disposed in the ice basket 10a is disposed on the inner peripheral side of the engaging downward suspending portion 50a7.

As described above, when the coffee liquid c is extracted, the ice basket 10a according to the present invention disperses and receives the coffee liquid c dripping from the extraction unit 3, and causes the coffee liquid c in a dispersed state to disperse and drip onto the ice 11 contained inside the ice storage I via the dripping holes h disposed in the lid 50a.

Furthermore, as illustrated in FIG. 4, a configuration is adopted so that a coffee liquid circulation passage Rc which prevents the ice 11 inside the ice storage I from coming out and allows the coffee liquid c inside the ice basket 10a to flow out is formed at an intermediate position between the ice basket 10a and the lid 50a, which corresponds to the coffee liquid spout 5b3 of the server 5.

[Position of Ice Basket Inside Server]

Figure 5:
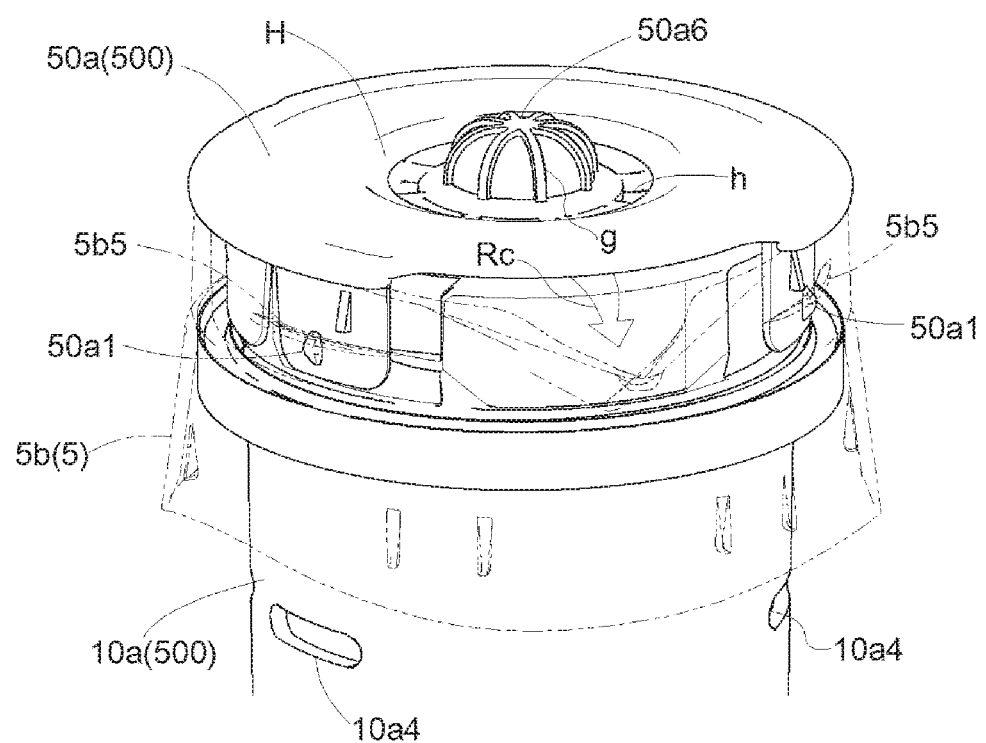
FIG. 5 is a view for describing a state of the ice basket connected to the server.

FIG. 5 illustrates a state where the ice basket 10a is contained in the server 5. In this state, the lid-ice basket connection body 500 is engageably connected to the upper portion support ring 5b.

In this drawing, a solid line mainly illustrates the lid 50a and the ice basket 10a (lid-ice basket connection body 500) in a state of being engageably connected to the lid 50a, and a two-dot chain line illustrates the upper portion support ring 5b disposed in the server 5.

The drawing illustrates a positional relationship between both of these after engagement. The lid 50a is operated so as to descend while being pushed from the upper portion of the server 5. In this manner, the server engaging projection 50a1 disposed in the lid 50a is located on the lower side of the engaging projection 5b5 disposed on the inner peripheral surface of the upper portion support ring 5b, thereby completing the engageable connection between both of these.

In this state, the ice basket 10a is located inside the server 5 while being suspended from the upper site of the server 5. In addition, as is understood from the cross section illustrated in FIG. 2, the lid 50a engages with the upper site of the server 5. The ice basket 10a is suspended, and is located inside the server 5.

In addition, as illustrated in FIG. 2, a configuration is adopted so that the bottom portion 10a1 of the ice basket 10a in this posture moves close to the bottom surface of the server 5, and then, is located at a position away from the bottom surface.

Furthermore, the iced coffee can be drawn out from the inside of the ice basket 10a through the coffee liquid circulation passage Rc illustrated in FIG. 4, in a state where the ice 11 is prevented from coming out from the ice storage I.

In the present embodiment, the liquid feeding hole 10a3 may be further disposed at the center of the bottom portion 10a1 of the ice basket 10a.

Another Embodiment

A In the above-described embodiment, an example has been described in which there are provided the ice basket 10a and the lid 50a used while being mounted on the server 5 when the hot coffee is extracted, and in which the ice basket 10a is used while being engageably connected to the lid 50a when the iced coffee is prepared.

However, when the hot coffee is extracted, it is not always necessary to disperse the coffee liquid c extracted in the extraction unit 3 in the circumferential direction. When the iced coffee is prepared, it is preferable that the coffee liquid c is caused to drip by properly dispersing the coffee liquid c onto the ice 11 contained inside the ice storage I.

FIGS. 6A-8B illustrate other embodiments for achieving this object.

Figure 6A:
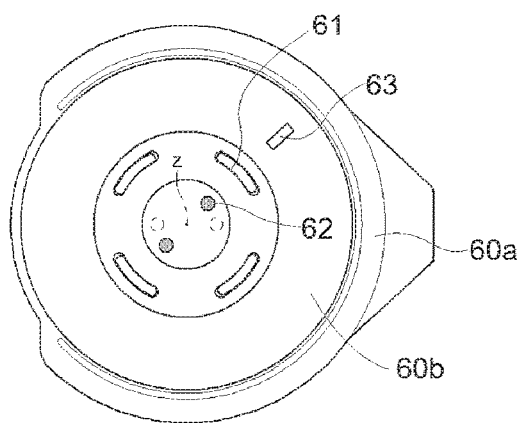
FIG. 6A is a view for describing another embodiment of a lid including a switching structure between a hot coffee passage and an iced coffee passage showing a use state when the iced coffee which needs to be dispersed is prepared.
Figure 6B:
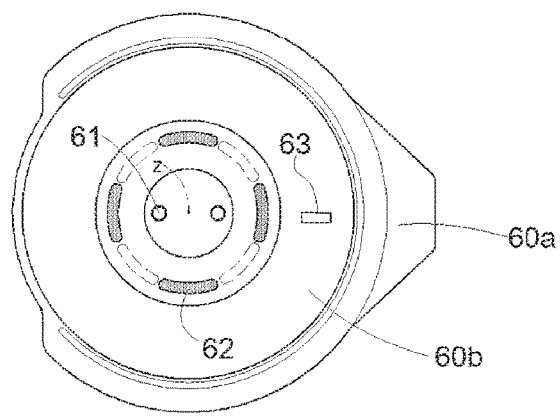
FIG. 6B is a view for describing the embodiment of FIG. 6A, showing a use state when the hot coffee which does not need to be dispersed is extracted.
Figure 7:
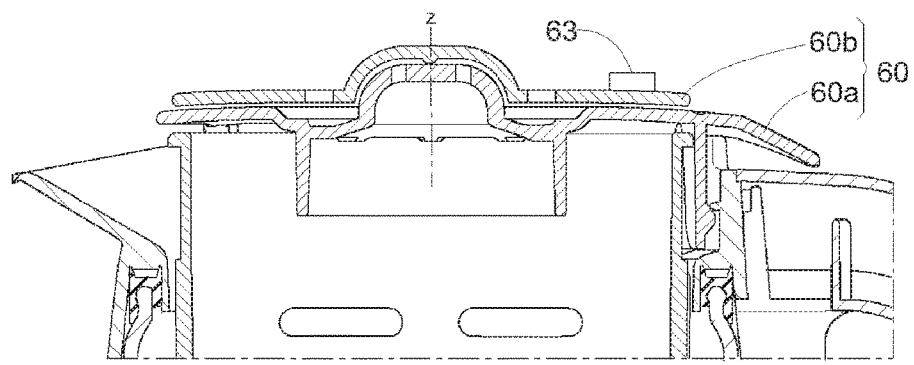
FIG. 7 is a sectional view illustrating a use state according to the embodiment illustrated in FIG. 6A and FIG. 6B.

In FIGS. 6A-7, two upper and lower lids 60 are configured, and a lid 60b on the upper side is pivotable around the central axis z with respect to a lid 60a on the lower side. In FIGS. 6A and 6B, a white hole portion 61 indicates a state where vertically located holes communicate with each other so that the coffee liquid c can drip. A black hole portion 62 indicates a state where the hole is closed by the lid 60a on the lower side.

FIG. 6A illustrates a use state when the iced coffee which needs to be dispersed is prepared, and FIG. 6B illustrates a use state when the hot coffee which does not to be dispersed is extracted.

Then, as illustrated in FIG. 7, an operation knob 63 disposed in the lid 60b on the upper side is used so as to relatively pivot the lid 60b on the upper side. In this manner, it is possible to realize the lid 60 which can be used for both the hot coffee and the iced coffee.

Figure 8A:
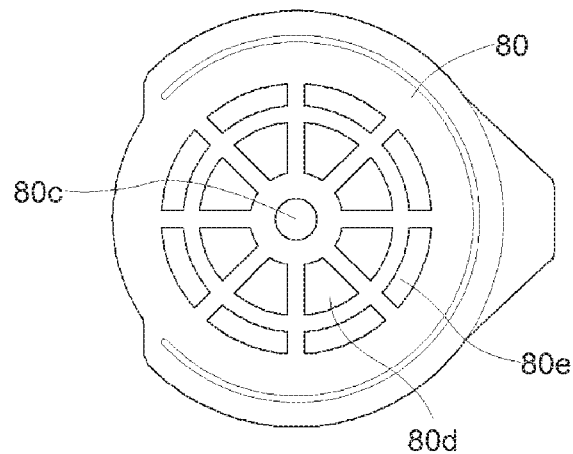
FIG. 8A relates to yet another embodiment of a lid, is a plan view illustrating a form of a lid for hot coffee.
Figure 8B:
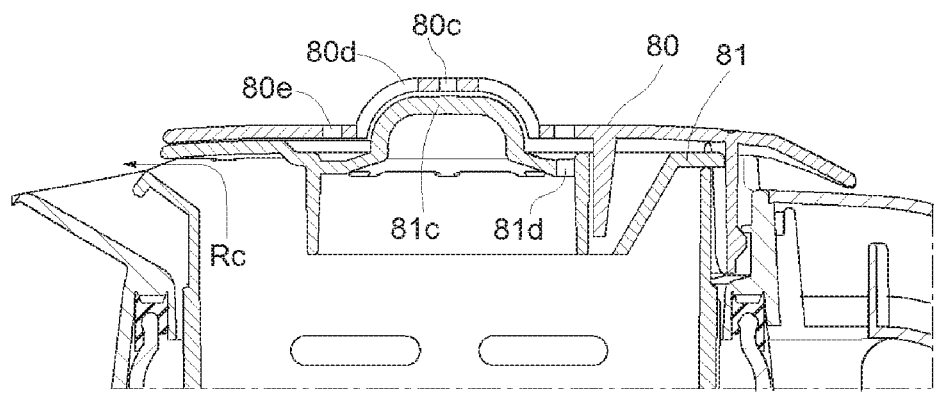
FIG. 8B relates to the embodiment of FIG. 8A, and is a sectional view illustrating a use state in a case where iced coffee is prepared using the lid for hot coffee.

B Similarly to the above-described configuration, FIGS. 8A and 8B illustrate an example in which two lids 80 and 81 are provided. In contrast, FIG. 8A illustrates the lid 80 used in a case where the hot coffee is extracted, and FIG. 8B illustrates a use form employed in a case where the iced coffee is prepared.

The lid 80 illustrated in FIG. 8A includes a central opening 80c, and a peripheral portion thereof includes 8 coffee liquid dripping ports 80d and 80e which respectively have a double ring shape.

Then, when the hot coffee is extracted, only the lid 80 including the central opening 80c illustrated in FIG. 8A is used. In this state, the coffee liquid c dripping from the extraction unit 3 is caused to drip to the server 5, and is stored in the server 5 without being substantially dispersed after passing through the central opening 80c.

On the other hand, when the iced coffee is prepared, a central projection 81c adopting basically the same configuration as that according to the present embodiment causes the lid 80 having the central opening 80c to be placed on the solid lid 81 (having no opening). In this manner, the coffee liquid c can be caused to drip onto the ice 11 in a state where the coffee liquid c is dispersed by using a dripping hole 81d disposed in the peripheral portion.

In the example illustrated in FIGS. 8A and 8B, a case has been described where the coffee liquid circulation passage Rc formed between the ice basket 10a and the lid 50a which is described above in FIG. 4 is opened similarly to the coffee liquid spout 5b3.

C The above-described embodiment adopts a configuration in which the ice basket 10a is located inside the server 5 while being suspended from the upper site of the server 5. However, as long as the position of the ice basket 10a which satisfies the object of the present application can be secured inside the server 5, other means in addition to the suspending means may be employed. For example, a support portion may be provided which separates the bottom portion 10a1 of the ice basket 10a from the bottom surface of the server 5 as far as a predetermined distance.

D The above-described embodiment adopts a configuration in which the ice basket 10a is suspended inside the server 5 via the lid 50a. However, it is possible to employ a structure in which the ice basket 10a is directly and internally suspended from the server 5 without using the lid 50a (for example, instead of the lid 50a, the upper portion support ring 5b is used, and in which the upper portion support ring 5b and the ice basket 10a can be engageably connected to each other by using a bayonet structure). If the ice basket 10a can be suspended without using the lid 50a in this way, the ice 11 can be directly put in the ice basket 10a in a state where the ice basket 10a is contained inside the server 5. However, in the present application, the bottom portion 10a1 of the ice basket 10a is provided close to the bottom surface of the server 5, but is separated therefrom. Accordingly, an impact in this case is not transferred to the server 5. As a result, even if the server is made of glass, there is no possibility of damage.

DESCRIPTION OF REFERENCE NUMERALS AND SIGNS

1 WATER TANK
1a INDEX LINE (QUANTITY INDICATING SCALE)
1ac INDEX LINE FOR ICED COFFEE (WATER QUANTITY INDICATING SCALE FOR ICE)
1ah INDEX LINE FOR HOT COFFEE
2 HEATING AND HOT WATER SUPPLY MECHANISM
2b GUIDE PASSAGE
3 EXTRACTION UNIT
5 SERVER
5a SERVER MAIN BODY
5b3 COFFEE LIQUID SPOUT
10a ICE BASKET
10a1 BOTTOM PORTION
10a2 PERIPHERAL WALL PORTION
10a3 LIQUID FEEDING HOLE
10a4 CHECKING WINDOW
50a LID
60 LID
80 LID
100 COFFEE MAKER
101 COFFEE MAKER MAIN BODY
500 LID-ICE BASKET CONNECTION BODY
CO COFFEE POWDER
Rc COFFEE LIQUID CIRCULATION PASSAGE
c COFFEE LIQUID
w WATER
h DRIPPING HOLE
hw HOT WATER
z CENTRAL AXIS
I ICE STORAGE

The invention claimed is:

1. A coffee maker comprising:
a water tank that stores water;
a heating and hot water supply that heats the water supplied from the water tank so as to generate hot water, and that supplies the generated hot water via a guide passage;
an extractor that extracts a coffee liquid by receiving the hot water supplied from the heating and hot water supply, in a state of containing coffee powder;
a server that stores the coffee liquid extracted in the extractor, the server having a coffee liquid spout; and
a bottomed cylindrical ice basket that is arranged inside the server, and that receives and disperses the extracted coffee liquid from the extractor,
wherein the ice basket internally includes an ice storage which is formed in a vertically elongated shape, a liquid feeding hole which feeds the coffee liquid inside the ice storage to the server is formed in a peripheral edge portion of a bottom portion of the ice basket, and the bottom portion is arranged at a position close to a bottom surface of the server while being separated from the bottom surface,
wherein the ice basket is configured to have a peripheral wall portion erected from the bottom portion and a peripheral edge portion of the bottom portion in a central axis direction,
wherein the ice basket is provided with a lid which is engageably connected in a state of covering an axially open end of the ice basket,
wherein the ice basket is suspended from the upper site of the server via the lid,
wherein the coffee maker further comprises a coffee liquid circulation passage that is disposed at a position between the ice basket and the lid, that prevents ice from coming out from the inside of the ice storage, and that allows the coffee liquid to flow into or to flow out from the ice basket, the coffee liquid circulation passage being formed in a site which is substantially the same as or close to the coffee liquid spout in circumferential phase in a circumferential direction of the ice basket, and
wherein the coffee liquid present between the server and the ice basket is taken out from the coffee liquid spout, and the coffee liquid present inside the ice basket is directly taken out via the coffee liquid circulation passage.

* * * * *